US010997391B2

(12) United States Patent
Perrier et al.

(10) Patent No.: US 10,997,391 B2
(45) Date of Patent: May 4, 2021

(54) METHOD FOR PROCESSING AN IMAGE OF A PAPILLARY IMPRESSION

(71) Applicant: COMMISSARIAT A L'ENERGIE ATOMIQUE ET AUX ENERGIES ALTERNATIVES, Paris (FR)

(72) Inventors: Regis Perrier, Grenoble (FR); Mathilde Bourjot, Saint Martin d'Heres (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 16/429,875

(22) Filed: Jun. 3, 2019

(65) Prior Publication Data
US 2019/0377928 A1 Dec. 12, 2019

(30) Foreign Application Priority Data
Jun. 8, 2018 (FR) ...................................... 18 55027

(51) Int. Cl.
*G06K 9/00* (2006.01)
*G06K 9/03* (2006.01)

(52) U.S. Cl.
CPC ..... *G06K 9/00067* (2013.01); *G06K 9/00107* (2013.01); *G06K 9/036* (2013.01)

(58) Field of Classification Search
CPC . G06K 9/00067; G06K 9/00107; G06K 9/036
See application file for complete search history.

(56) References Cited

U.S. PATENT DOCUMENTS

| 2009/0285459 A1* | 11/2009 | Aggarwal | G06K 9/00073 382/125 |
| 2010/0080425 A1 | 4/2010 | Bebis et al. | |
| 2011/0274356 A1* | 11/2011 | Tasdizen | G06K 9/4647 382/195 |
| 2014/0226906 A1* | 8/2014 | Kang | G06K 9/6211 382/197 |
| 2016/0042516 A1* | 2/2016 | Tieu | G06K 9/4671 382/124 |

OTHER PUBLICATIONS

Preliminary French Search Report dated Feb. 20, 2019 in French Application 18 55027 filed on Jun. 8, 2018 (with English Translation of Categories of Cited Documents).

(Continued)

*Primary Examiner* — Stephen G Sherman
(74) *Attorney, Agent, or Firm* — Oblon, McClelland, Maier & Neustadt, L.L.P.

(57) ABSTRACT

A method of processing a papillary print includes a step to detect a singular zone on the image, the singular zone being characterised by a position, and an orientation representative of a value of the gradient of the intensity of the image; a step to extract control patches, each control patch having one of the singular zones detected in step a); a step to project control patches in a reference base, so as to determine the projection coordinates of each control patch on the reference base, projection of a control patch on the reference base forming a projected patch; and a step to calculate a difference in projection of control patches relative to the projected patches.

18 Claims, 10 Drawing Sheets

(56) References Cited

OTHER PUBLICATIONS

Ching-Tang Hsieh, et al., "Principal Component Analysis for Minutiae Verification on Fingerprint Image", Proceedings of the 7th WSEAS International Conference on Multimedia Systems & Signal Processing, Apr. 15-17, 2007, 5 pages.

Xunqiang Tao, et al., "A Novel Measure of Fingerprint Quality Using Principal Component Analysis (PCA)", Biometrics (ICB), 2012 5th IAPR International Conference on, IEEE, Mar. 29, 2012, 6 pages.

Mathilde Bourjot, et al., "Etude d'algorithmes d'authentification pour petits capteurs d'empreinte digitale", Colloque Coresa, 2017, 7 pages.

Chris Harris, et al., "A Combined Corner and Edge Detector", Fourth Alvey Vision Conference, 1988, 5 pages.

S.M. Smith et al., "SUSAN—A New Approach to Low Level Image Processing", Technical Report TR95SMS1c., 1995, 59 pages.

D.G. Lowe et al., "Distinctive Image Features from Scale-Invariant Keypoints", International Journal of Computer Vision, 60(2), 2004, 28 pages.

\* cited by examiner

METHOD FOR PROCESSING AN IMAGE OF A PAPILLARY IMPRESSION

TECHNICAL FIELD

This invention relates to a method for processing an image of a papillary print, particularly for determination of the quality of said image. This invention also relates to a computer program adapted to implement the method for processing the image of a papillary print.

Finally, this invention relates to a device provided with a computer program designed to use the method for processing the image of the papillary print.

STATE OF PRIOR ART

Biometry includes a large number of consumption products, and particularly objects for the general public such as mobile phone, laptop, personal data assistants or any other element requiring identification of a person.

Biometry generally includes recognition of morphological characteristics of a person, for example such as papillary prints, in comparison with one or several reference data previously collected and stored during a step called enrolment step, and representative of said morphological characteristics.

It is then essential to acquire good quality reference data to insure optimum efficiency of the identification system used. Thus, enrolment of a papillary print as reference data is usually followed by an evaluation of the quality of this reference data.

This evaluation step, quite easy for an experienced human eye, is significantly more complicated for a computer, and may require the use of complex algorithms or calculations, such as filtering methods, statistical measurements on the distribution of pixels or contours or "black box" methods such as neural networks. However these methods require calculation capabilities and methods that are not always compatible with use in increasingly miniaturised objects.

Furthermore, these methods are only slightly or not sensitive to the quantity of discriminant information actually contained in said image.

Document [1] cited at the end of the description applies to singular zones of a fingerprint, and particularly singular points (defined in the remainder of the description) of said print, for recognition and/or identification of a person.

Singular zones of a papillary print can be classified in a decreasing scale into order 1, 2 and 3 characteristics.

Order 1 characteristics relate to the global shape of the print, and for example include arches, loops and whorls.

Order 2 and 3 characteristics (also called "singular points") of a papillary print gather patterns that can differentiate two papillary prints with the same global shape, and therefore represent discriminating information. FIGS. 11a to 11j non-exhaustively illustrate examples of order 2 characteristics. Order 3 characteristics include pores and variations in the thickness of ridges and valleys.

However, we note that this document [1] does not in any way mention evaluation of the quantity of discriminating information actually contained in an enrolment print.

Nevertheless, this new criterion has considerable importance in that the relatively small size of the print sensors contained in commercial objects correspondingly reduces the quantity of discriminating information, and consequently the capacity of algorithms to distinguish one individual from another with reference to a reference data.

Therefore one purpose of this invention is to propose a method of processing a papillary print that is easier and faster to use than methods known to the skilled in the art.

Another purpose of this invention is to propose a method of processing a papillary print capable of evaluating both the quality of said collected print and the quantity of relevant information contained in it.

Another purpose of this invention is to be able to propose a recognition of a papillary print in comparison with an enrolment image.

Another purpose of this invention is to propose a reliable method of processing a papillary print obtained with a small sensor, particularly smaller than 50 mm$^2$.

PRESENTATION OF THE INVENTION

The purposes of the invention are at least partly achieved by a method for processing an image of a papillary print designed to be executed by a computer, comprising:

a) a step for detecting at least one singular zone on the image, each singular zone being characterised by a position (p), and an orientation ($\theta$) representative of a value of the gradient of the intensity of the image at position (p);

b) a step for extracting patches, called control patches, each control patch comprising one of the singular zones detected in step a), and advantageously being centred on said singular zone;

c) a step for projecting control patches on a base of reference patches, called the reference base, so as to determine the projection coordinates of each control patch on said reference base, projection of a control patch on the reference base forming a projected patch, the reference patches base comprising at least two reference patches each associated with a different type of singular zone;

d) a step for calculating a difference in projection of control patches relative to the projected patches.

According to one embodiment, the reference patches base comprises reference patches associated with at least two distinct order 2 and/or 3 singular zones.

According to one embodiment, step b) for extracting control patches also includes a step for orienting said patches along a principal axis so as to align the singular zones with said axis.

Orientation of the patches can thus facilitate step c) for projecting patches on the reference patches base, and also to reduce calculation times.

This reorientation also facilitates the comparison between said reoriented patches and their projection on the reference patches base.

According to one embodiment, step a) for detecting singular zones on the image comprises detection of a variation in the contrast of the intensity of the enrolment image.

According to one embodiment, detection of the contrast variation includes the calculation of spatial derivatives of the intensity of each position of the enrolment image.

According to one embodiment, step a) includes use of the Harris method.

According to one embodiment, each control patch extracted in step b) is written in a vector form, the vector form including intensities of each pixel of the patch considered, for components.

According to one embodiment, step d) for calculating the projection difference includes the calculation of an error called the construction error, said construction error including the calculation of the normalised sum of the differences between each control patch and its reconstructed patch.

According to one embodiment, an enrolment image is qualified as a quality image when the construction error is less than a predetermined value.

According to one embodiment, the method also includes a step e) for quantifying discriminating information contained in the enrolment image, said discriminating information relating to singular points actually detected in step a).

According to one embodiment, step e) includes the evaluation of the dispersion of at least two projection coordinates, for the set of control patches, relative to at least two reference patches called principal reference patches.

According to one embodiment, the singular zones detected in step a) comprise order 2 or higher characteristics.

According to one embodiment, the reference base is constructed from at least one reference image, of at least one papillary print.

According to one embodiment, construction of the reference base includes the following steps:

a1) a step for detecting singular zones on the at least one reference image, each singular zone called a primitive singular zone being characterised by a position p1, and an orientation θ1 representative of a value of the gradient of the intensity of the reference image at position p1;

b1) a patch extraction step to extract primitive patches, each of the primitive patches being centred on one of the primitive singular zones detected in step a1);

c1) a step for analysing the set of primitive patches into principal components oriented so as to extract the reference base and the associated reference eigenvalues.

According to one embodiment, the singular zones detected in step a1) comprise order 1 or higher characteristics, advantageously order 2 or higher characteristics.

According to one embodiment, step b1) for extracting primitive patches also includes a step to orient said patches along a principal axis so as to align the primitive singular zones with said axis.

The invention also relates to a computer program comprising instructions that, when the program is executed on a computer, lead to of the implementation of the method according to the invention.

The invention also relates to an electronic device on which the computer program is installed, and provided with a papillary prints sensor for which print images acquired by the print sensor will be processed by said computer program.

BRIEF DESCRIPTION OF THE DRAWINGS

Other characteristics and advantages will be given in the following description given with reference to the appended drawings in which.

DETAILED PRESENTATION OF PARTICULAR EMBODIMENTS

This invention proposes a method for processing an image of a papillary print, called the enrolment image. In particular, this invention discloses a method for determining the quality of the enrolment image.

In this respect, it is proposed to limit processing of the enrolment image to singular zones (for example also called order 1 to 3 characteristics) of the print and to compare the image of these zones with a reference base. More particularly, the invention also initially comprises an extraction of control patches, possibly oriented, of the enrolment image, each being centred on singular zones of said image.

The extracted control patches are then projected on a reference patches base, particularly an orthogonal base, from which a set of projected patches is derived.

The calculation of the sum of Euclidean distances between each of the control patches and its projection can then be used to establish the quality of the enrolment image.

The invention will now be described in detail with reference to FIGS. 1, 2, 3a to 3c and 12-14.

Figure 1:
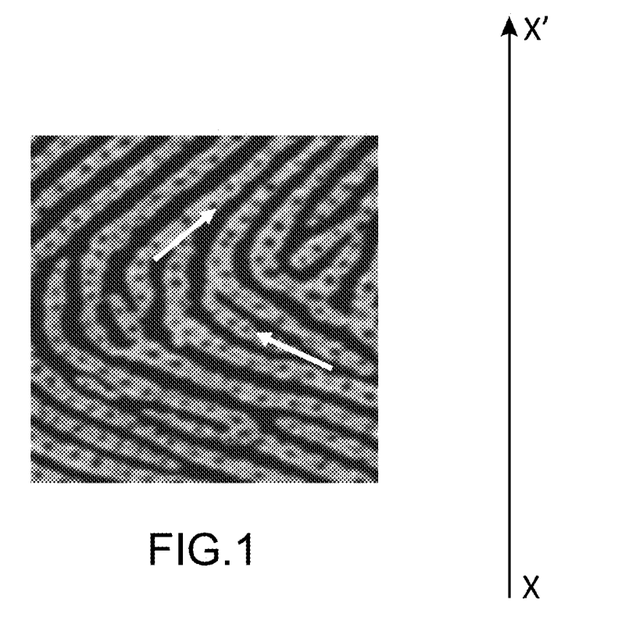
FIG. 1 is an enrolment image of a papillary print on which the processing method according to this invention is used.

FIG. 1 represents an image of a papillary print, that in this case is a finger print, the image being called the enrolment image in the following.

Throughout the remainder of the disclosure, it is understood that an image is an arrangement of pixels, particularly a matrix arrangement of pixels, along two orthogonal directions. It is also understood that each pixel is representative of a value of the image intensity, at the actual location of the pixel considered.

The remainder of the disclosure will also make use of the concept of "patches" that are also images, and for which the definitions cited above are applicable. More precisely, a patch represents a part of a given image. Preferably, the patches are cut such that each patch comprises discriminating information about a print (also called a singular or characteristic zone in the remainder of the description).

The enrolment image may be the result of an acquisition of a papillary print by a sensor, particularly an optical sensor or capacitive sensor, of any size whatsoever. However, according to this invention, the sensor may be small, and more particularly, its surface area may be less than 50 mm$^2$, for example equal to 20 mm$^2$.

Figure 12:
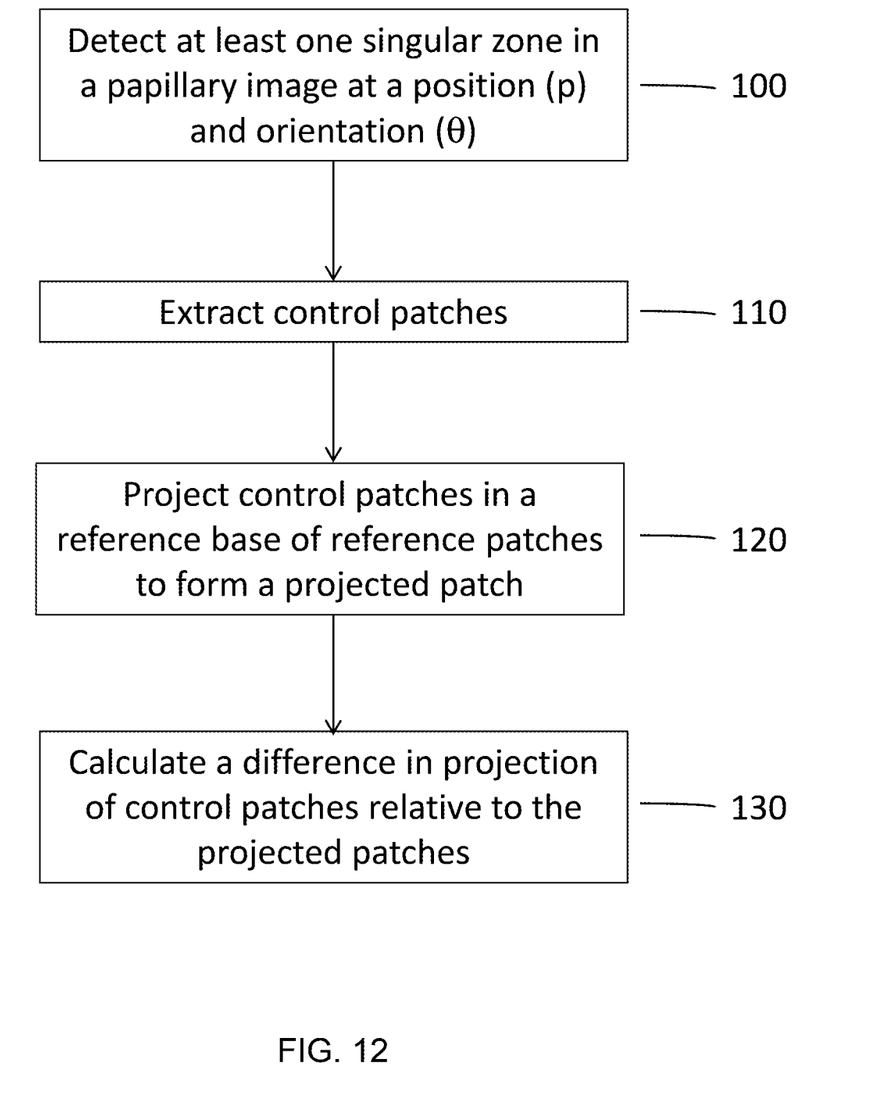
FIG. 12 is a diagram of the method according to an embodiment of the invention.

The processing method shown in the diagram of FIG. 12 includes a step 100 for detecting singular zones in the enrolment image. "Singular zones" means changes in the continuity of papillary print lines, then introducing points around which variations of pixel values can be observed.

As a reminder, singular zones of a papillary print are grouped in three sub-sets called order 1, 2 and 3 characteristics respectively.

Order 1 characteristics include arches, loops and whorls.

Order 2 and 3 characteristics include so-called singular points.

In this respect, FIGS. 11a to 11j non-exhaustively illustrate order 2 characteristics. Order 3 characteristics include pores and variations in the thickness of peaks and valleys. The invention is particularly suitable to detect order 2, or even order 3 and higher characteristics.

Thus, the group of order 2 (and also order 3) characteristics contains several types of characteristic points. In the remainder of the disclosure, different intra-order types (within the same order of characteristics) or inter-order types (between two different orders of characteristics) of singular points, can be considered.

A singular zone, and more particularly a singular point, is then characterised by its position p in the image and its orientation θ in the image. Position p corresponds to the coordinates of pixels forming the singular zone in the image coordinate system. The orientation θ (described in detail in the following) is representative of a value of the gradient of values of pixels forming the singular zone at position p.

In the following, "the gradient of values of pixels forming the singular zone at position p" is called the intensity gradient. More precisely, "local" refers to the patch as will be described later. The positions and orientations of these singular zones can then be used to distinguish one individual among others, or one finger among others. Singular zones, and particularly singular points, are points for which the spatial derivatives of the image in their close proximity are not zero.

Figure 11A:
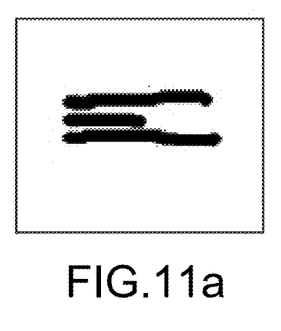
FIGS. 11a to 11j are representations of minutiae that might be observed at a papillary print.
Figure 11B:
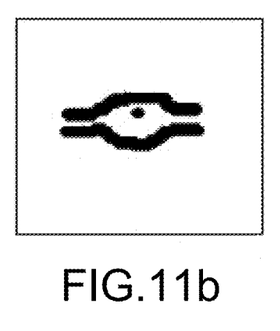
Figure 11C:
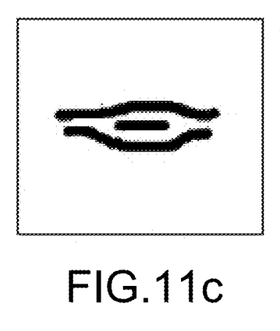
Figure 11D:
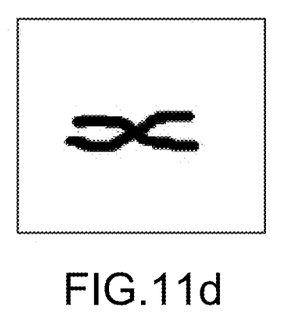
Figure 11E:
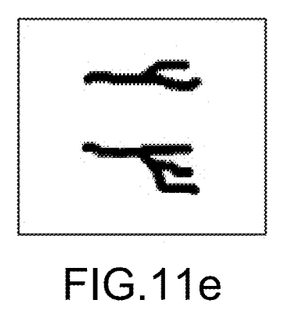
Figure 11F:
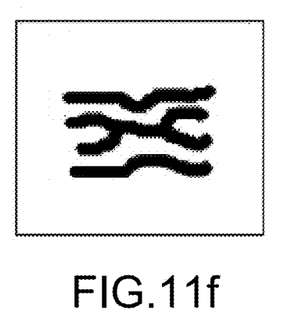
Figure 11G:
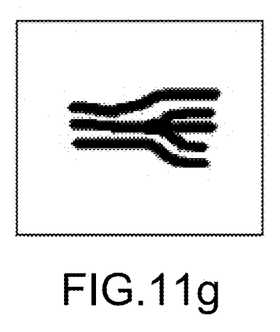
Figure 11H:
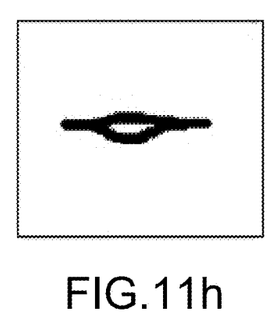
Figure 11I:
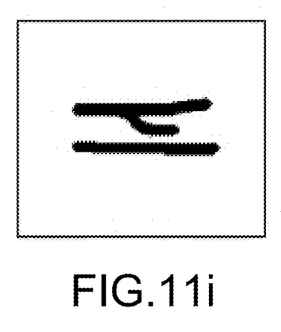
Figure 11J:
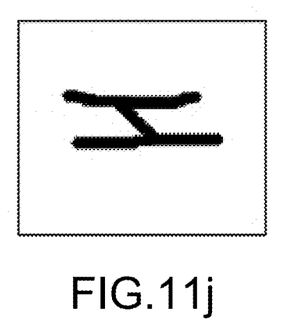

In particular, order 2 or higher order singular (or characteristic) zones, for example order 3, can be observed. In particular, order 2 singular points (minutiae) illustrated on FIGS. 11a to 11j can include a termination (FIG. 11a); an island 1 (FIG. 11b); an island variant (FIG. 11c); an intersection (FIG. 11d); a simple or multiple bifurcation (FIG. 11e); an opposite branch (FIG. 11f); a deltoid branch (FIG. 11g); a lake (FIG. 11h); a hook (FIG. 11i); and/or a bridge (FIG. 11j).

In any case, order 2 or order 3 singular points characterise a break in the continuity of papillary lines and can be detected based on this break of continuity.

One technique particularly well adapted to the detection of singular zones, particularly order 2 or higher order characteristics, is the Harris method or detector described in document [2] cited at the end of the description. This method comprises in particular surface scanning of the image at a given pitch (for example one pixel) by a window of a predetermined size, and evaluation of the difference or the error between two successive windows. As soon as the error is more than a threshold value, it is concluded that a minutia is present.

Detection of singular zones and their marking on the enrolment image according to the invention are not limited to use of the Harris detector. The skilled in the art will also be able to apply other methods, for example such as the SUSAN and SIFT methods described in documents [3] and [4] respectively cited at the end of the description.

An examination of FIG. 1 also clearly reveals that order 2 singular points have an "orientation" (identified by the white arrows in FIG. 1), called the orientation θ in the following description. This is the general orientation of the papillary lines at the location of a given order 2 singular point, in other words considering a tangent to at least one of the papillary lines forming said singular point, and is representative at the scale of the patch of the intensity of the enrolment image at position p. In particular, the orientation θ is expressed related to a principal axis denoted XX' on FIG. 1.

In particular, the orientation θ at the point with coordinates x and y in the coordinate system of the enrolment image can be estimated using the following relation:

$$\theta(x,y)=\arctan 2(\nabla_{\sigma\theta}^{y}E(x,y),\nabla_{\sigma\theta}^{x}E(x,y))$$

Figure 2:
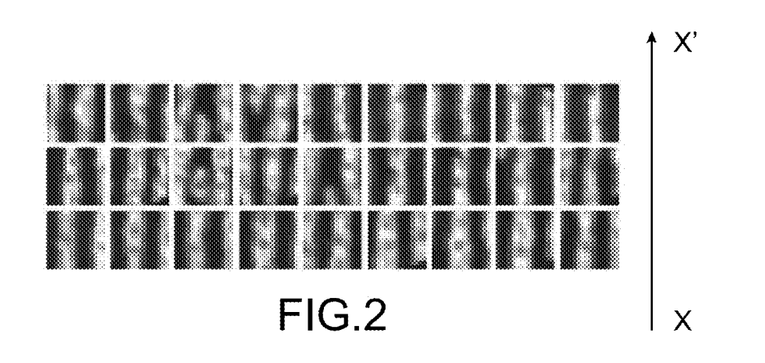
FIG. 2 is a diagrammatic representation of oriented patches extracted from the enrolment image in FIG. 1 in step b) of the method according to this invention.

In which:

$\nabla_{\sigma\theta}^{y}E(x,y)$ is the gradient along the y direction of the coordinate system of the enrolment image;

$\nabla_{\sigma\theta}^{x}E(x,y)$ is the gradient along the x direction of the coordinate system of the enrolment image;

Step 100 is followed by a step 110 for the extraction of patches, called control patches (FIG. 2).

Each of the control patches can be centred on one of the singular points detected in step 100. See step 111 in FIG. 13.

Figure 13:
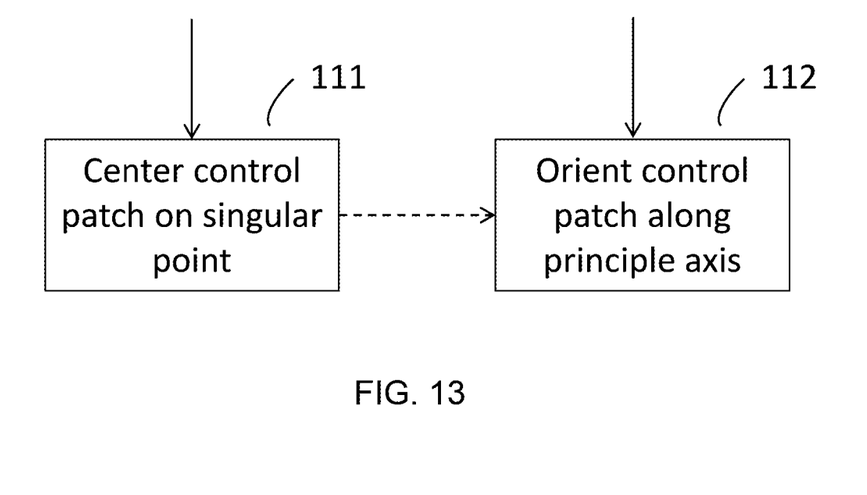
FIG. 13 is a diagram of a step of placement and orientation of control patches.

Additionally or alternatively, the control patches can be oriented along the direction of the principal axis XX' so as to align the tangents of identified singular points along said axis, shown in step 112 of FIG. 13. In other words, the orientation of a patch associated with a singular point with orientation θ includes rotation of the singular point at an angle −θ.

Orientation of the patches can thus facilitate step 120 (described below) to project patches on the reference patches base, and also to reduce calculation times.

This reorientation also facilitates the comparison between said reoriented patches and their projection on the reference patches base.

The remainder of the description will only refer to oriented control patches, referred to as oriented patches.

It should be understood, without it being necessary to clearly state it, that the patches and particularly oriented patches are portions of the enrolment image, and are smaller than the enrolment image. For example, the size of patches (the size of a patch is equal to the dimensions of one and the other of its sides) may be between ¼ and ⅓ of the width of a papillary line.

Furthermore, each oriented patch index "i" then represents a vector $v_i$, the components of which correspond to the intensities of each pixel forming part of said oriented patch.

The method also includes step 120 for projecting the oriented patches in a patches base comprising reference patches bj, (for example in which j is an integer number between 1 and k), called the reference base in the remainder of the description. The reference base may be an established base and may be constructed using a method that will be described below in the disclosure.

The reference patches base advantageously comprises at least two reference patches associated with two different types of singular points. It may be two types of the same order of characteristics (intra-order) or between two different orders of characteristics (inter-order).

Advantageously, the reference patches base comprises reference patches associated with order 2 singular zones.

Alternatively and/or additionally, the reference patches base comprises reference patches associated with order 3 singular zones.

It is also advantageous to consider more than two types, and for example to cover the ten order 2 types illustrated in 11a to 11j, and order 3 types.

The richness of the reference base allows a better representation of oriented patches after the projection step.

Projection of oriented patches in the reference base can be used to determined projection coordinates $\alpha_{ij}$ of each oriented patch on said base.

Each of the projection coordinates $\alpha_{ij}$ of an oriented patch i on a reference patch $b_j$ is equal to the scalar product of vector $v_i$ of each oriented patch and the scalar vector of reference patches $b_j$:

$$\alpha_{ij} = v_i^T b_j$$

Starting from these projection coordinates, the method includes the construction of a patch called the reconstructed patch $w_i$. This reconstructed patch is determined from a linear combination:

$$w_i = \sum_{j=1}^{k} \alpha_{ij} b_j$$

In which k corresponds to the number of reference patches selected for the construction of this reconstructed patch. It will then be understood that as k increases, the reconstructed patch will become closer to the oriented patch. Finally, determination of the reconstructed patch makes it possible to approach the oriented patch starting from the reference base.

In the case of the search for a reliable enrolment image, the projection step is followed by step 130 for calculating a difference between projection of control patches and projected patches. The projection difference can be an indicator of the quality of the enrolment image on the projection coordinates base αij determined in step 120.

In particular, step 130 may include the calculation of an error, called the construction error. For example, the construction error "e" can include the calculation of the normalised sum of Euclidean distances of each oriented patch from its projected patch.

More particularly, the construction error "e" may be estimated as described below by calculating the average of the norms of errors between oriented patches and reconstructed patches:

$$e = \frac{\sum_{i=1}^{m} \|v_i - w_i\|}{m}$$

where m is the number of oriented patches actually extracted in step 110.

Thus, the error e can be used to compare reconstructed patches and enrolment patches previously stored in an enrolment base including patches of the enrolment image. It should be noted that the reference base and the enrolment base could only form a single and unique base if the construction error e is suitable, for example less than a threshold value. In other words, the enrolment patches can be added to the reference base when the construction error is less than the threshold value.

Each of FIGS. 3a-3c and 4a-4c illustrate a comparative example of the method for processing a first enrolment image (FIG. 3a) and a second enrolment image (FIG. 4a) with different qualities, respectively. Extraction of oriented patches from the first and second enrolment images gives a first series of oriented patches (FIG. 3b) and a second series of oriented patches (FIG. 4b), respectively.

Figure 3A:
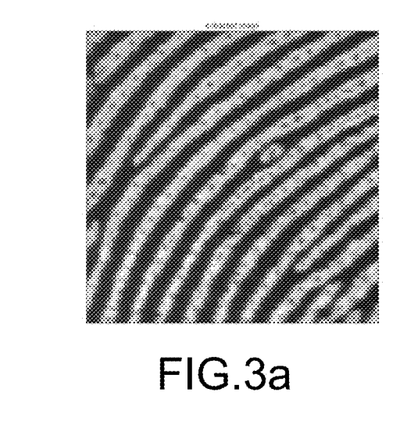
FIGS. 3a to 3c represent a first enrolment image, a first series of oriented patches extracted from the first image and a representation of the construction error according to this invention, respectively.
Figure 3B:
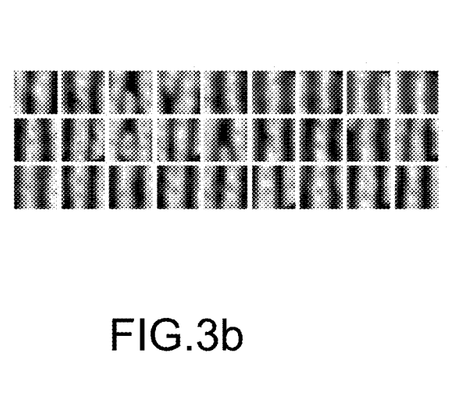
Figure 3C:
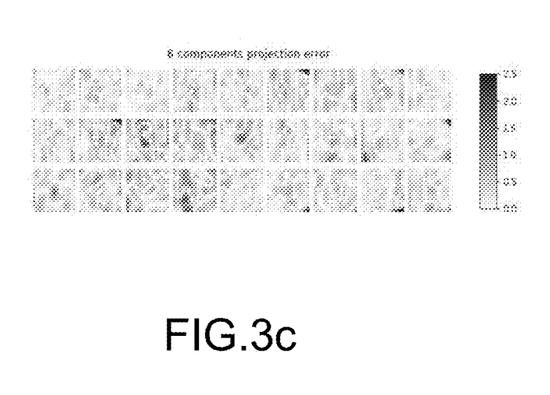
Figure 4A:
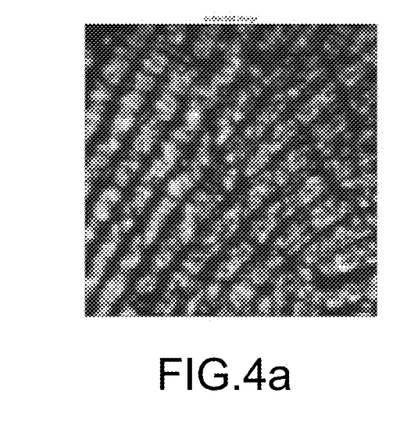
FIGS. 4a to 4c represent a second enrolment image, a second series of oriented patches extracted from the second image and a representation of the construction error according to this invention, respectively.
Figure 4B:
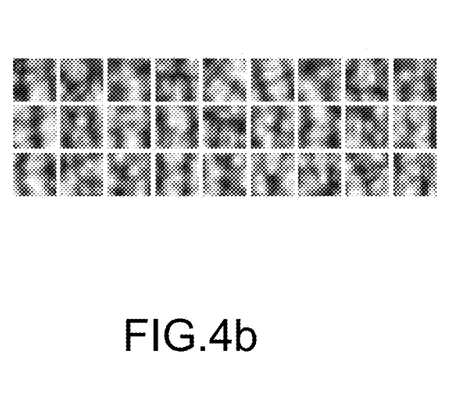
Figure 4C:
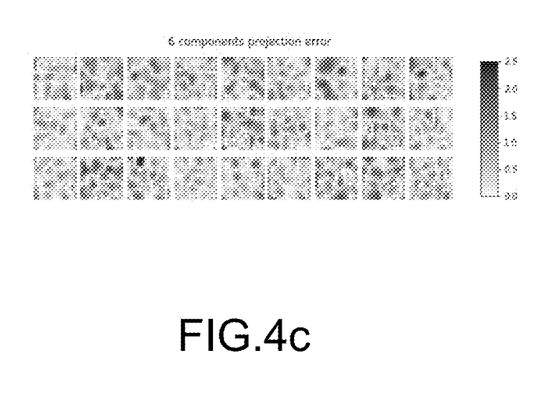
Figure 5A:
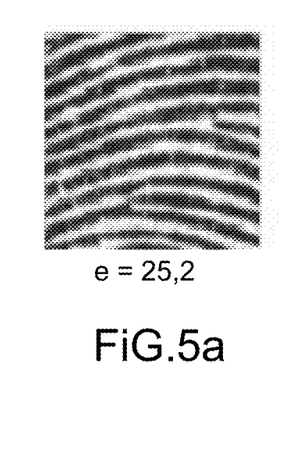
FIGS. 5a to 5e are representations of enrolment images sorted in order of decreasing quality.
Figure 5B:
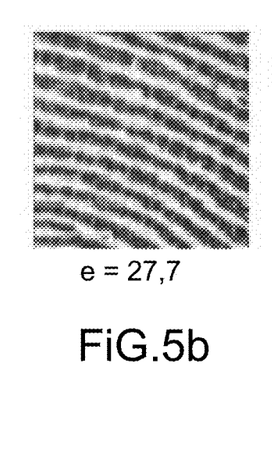
Figure 5C:
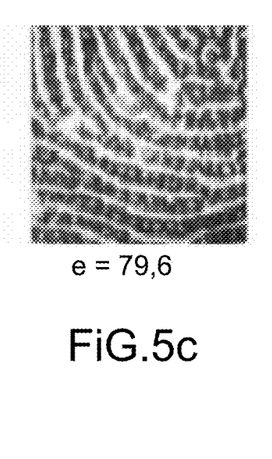
Figure 5D:
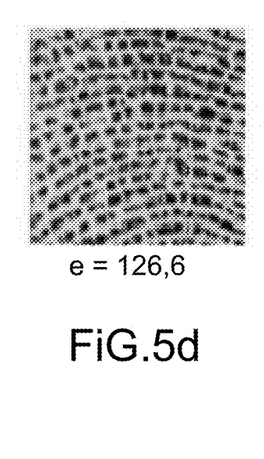
Figure 5E:
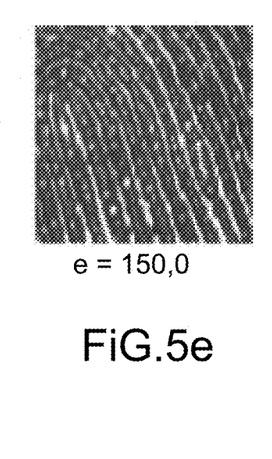

FIGS. 3c and 4c represent construction errors "e" associated with the first image and the second image respectively. These two figures very clearly show, at least their contrasts in grey levels, that the construction error is larger in the case of processing of the second image than in processing of the first image.

Also for illustration, FIGS. 5a to 5e represent enrolment images in order of decreasing visual quality. Construction errors (given below each enrolment image) calculated according to this invention follow the same trend and show a decreasing quality from image 5a to image 5e.

Therefore, these results that can be predicted by making a simple visual examination can be evaluated automatically and objectively using this invention, with appropriate computer processing according to this invention, without requiring excessive computer resources.

Thus, in using a criterion on the construction error, for example by setting up a threshold value of said error, it can be established that an enrolment image does or does not satisfy a predetermined quality level.

If a print is recognised, the method includes a comparison, for example by the same calculation as the construction error, between reference patches and enrolment patches previously stored in the enrolment base. Thus, there is no need to reconstruct the patches to make a recognition, it is possible to stay in the enrolment base and compare the alpha coordinates of two projected patches in the enrolment base to determine whether or not they are similar.

The method may also include a step for quantifying discriminating information contained in the enrolment image, said discriminating information relating to singular points actually detected in step 100. More particularly, the processing method may include a step to measure the variety of oriented patches extracted in step 110.

Figure 6A:
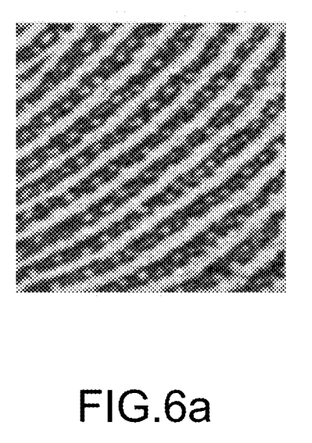
FIGS. 6a and 6b are papillary print images containing a small amount of discriminating information and a set of oriented patches extracted from said image, respectively.
Figure 6B:
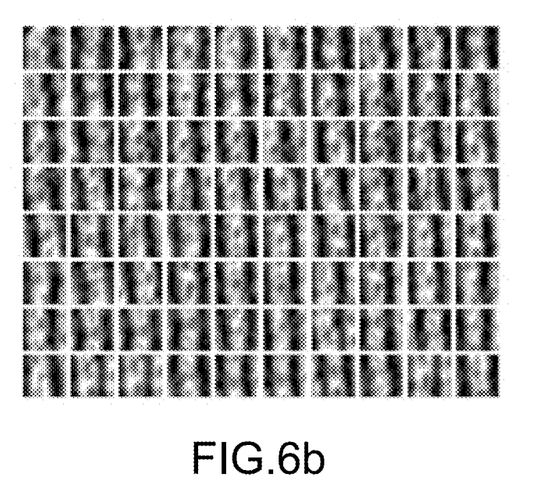
Figure 7A:
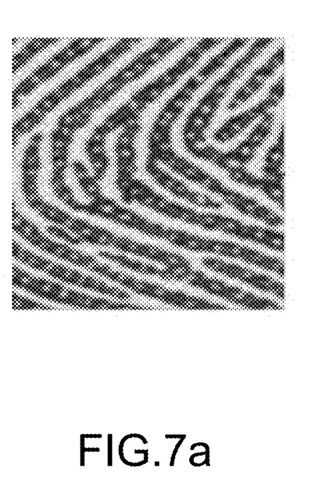
FIGS. 7a and 7b are papillary print images containing discriminating information and a set of oriented patches extracted from said image, respectively.

For example, FIGS. 6a-6b and 7a-7b illustrate the case of a print that is only slightly discriminating (FIG. 6a) and the case of a discriminating print (FIG. 7a). The print that is only slightly discriminating (FIG. 6a) has few or no papillary line breaks. More particularly, practically no order 2 singular point can be seen. Oriented patches extracted from this same print (FIG. 6b) are relatively only slightly varied such that a recognition process executed based on this print would not be very reliable.

Figure 7B:
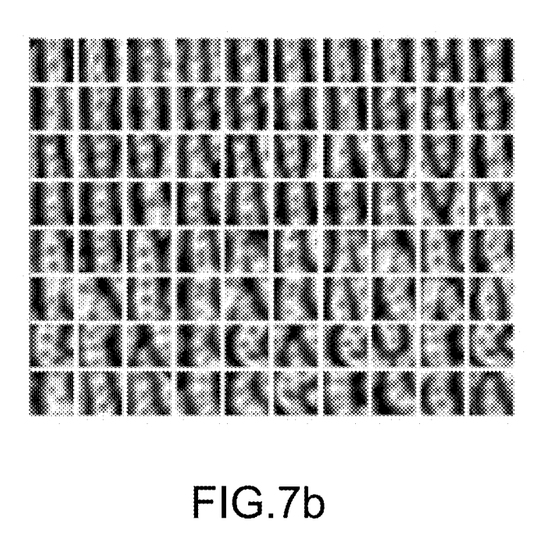

On the contrary, FIG. 7a is associated with a significantly more discriminating print. Many bifurcations, reorientations or continuity breaks in papillary lines can be observed on this print. The result is oriented patches with a variety of aspects (FIG. 7b).

Although the evaluation discussed above is based on a visual nature, it can also be processed more systematically and objectively based on the terms of this invention. In particular, step for quantifying discriminating information can include the evaluation of the dispersion of at least two projection coordinates, for all oriented patches, relative to at least two reference patches of said principal reference patches.

Figure 8A:
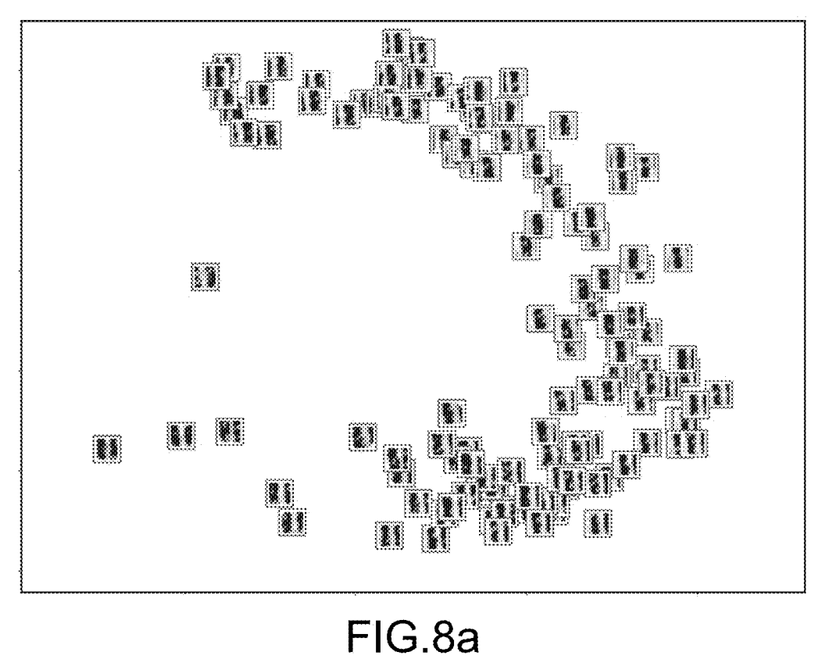
FIGS. 8a and 8b are graphic representations of the dispersion of patch projection coordinates in the reference base of FIGS. 6a and 7a respectively, along the first two axes of the reference base.
Figure 8B:
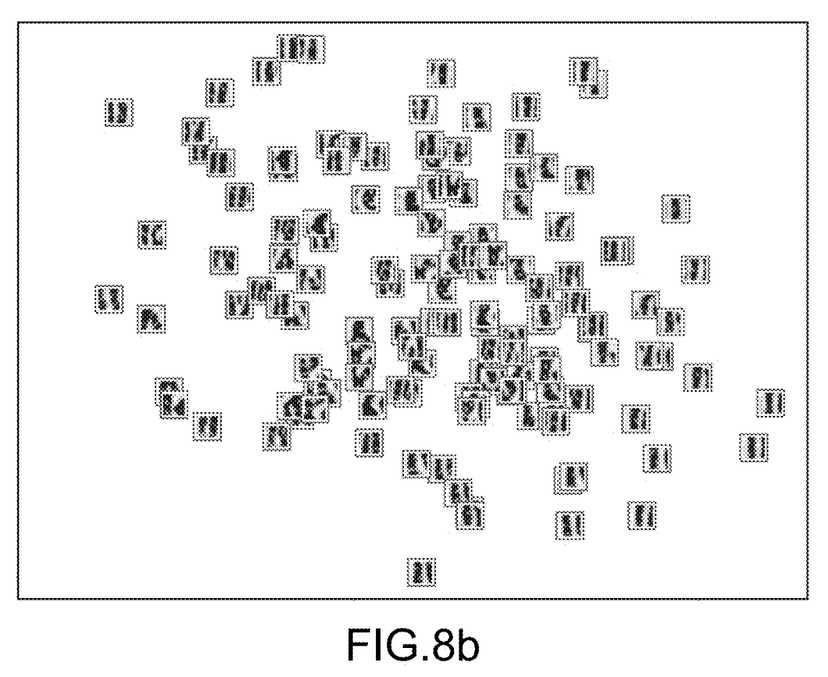

In this respect, FIGS. 8a and 8b represent the dispersions of two projection coordinates of the print in FIG. 6a and the print in FIG. 7a, respectively.

Thus, the result observed in relation to the only slightly discriminating print (FIG. 8a), is a lesser dispersion of the projection coordinates than in the case of the discriminating print (FIG. 8b). Thus, a criterion estimated on the quantity of discriminating information would lead to refusal of the print in FIG. 6a and acceptance of the print in FIG. 7a.

An example of the method of constructing the reference base will now be described. However, it is clear that the method of processing an image of a papillary print can be implemented using a previously prepared reference base.

Figure 9A:
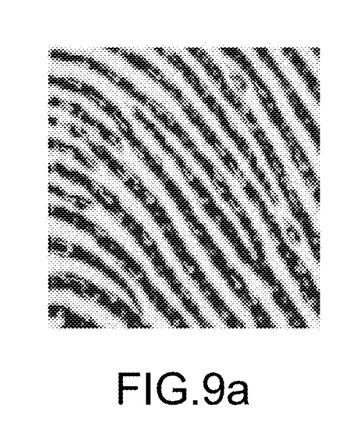
FIGS. 9a to 9c are representations of successive steps of a method of construction of a reference patches base.
Figure 9B:
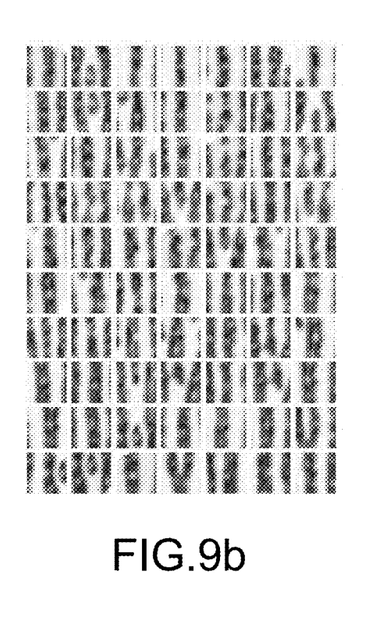
Figure 9C:
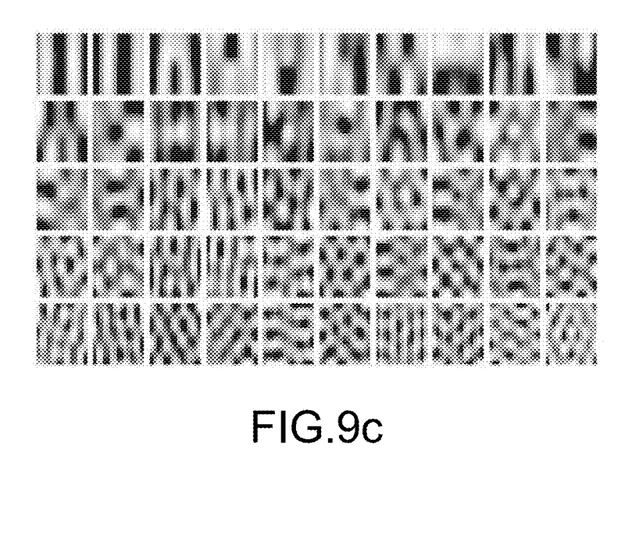
Figure 10A:
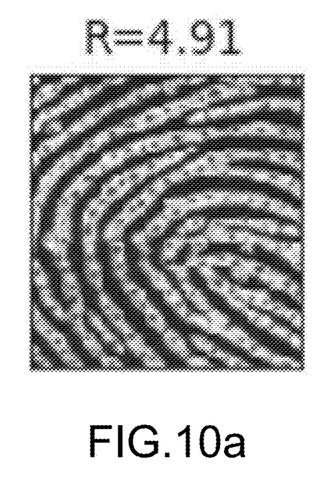
FIGS. 10a to 10d are representations of enrolment images sorted in order of decreasing amount of discriminating information, the quantity of discriminating information between evaluated by the value "R" indicated above each image (R being the ratio between the highest projection coordinated to the lowest projection coordinate)
Figure 10B:
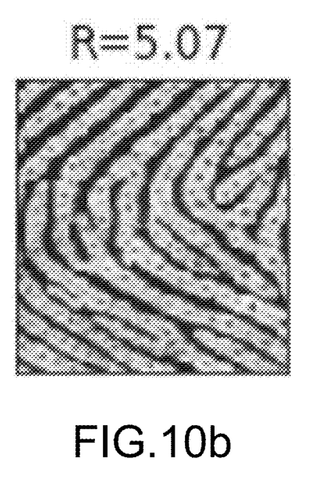
Figure 10C:
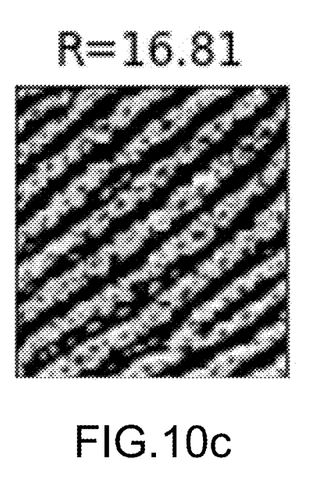
Figure 10D:
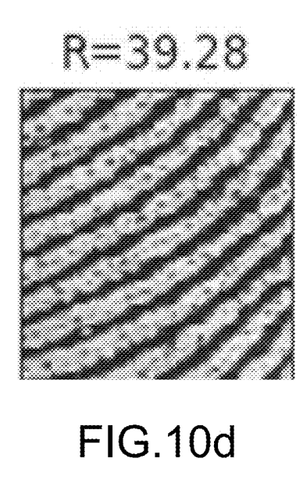

FIGS. 9a to 9c represent successive steps of a method of construction of the reference base.

The reference base may be constructed from at least one image, called the reference image (FIG. 9a), of at least one papillary print. For example, the number of reference images may be more then 5, preferably more than 10, for example equal to 15.

The quality of the reference base constructed using the method described below may depend on the quality, and particularly the visual quality, of the reference image.

A reference image selection step based on visual criteria such as the quality of the image and on the discriminating information that it contains can be used prior to construction of the reference base.

This choice may be controlling when the constructed reference base is used for the recognition and/or identification of individuals through their papillary prints.

Construction of the reference base may include a step a1) for detecting order 2 or higher singular points, on at least one reference image.

Each singular point is characterised by a position p1, and an orientation θ1 representative of a value of the local intensity gradient of the reference image at position p1.

This step is similar to step 100 described above.

Figure 14:
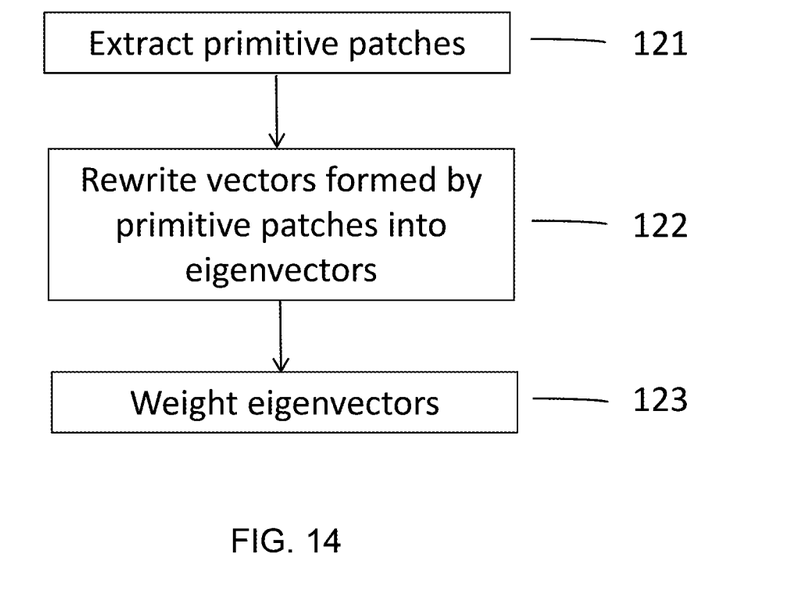
FIG. 14 is a diagram of a principle components analysis step.

The method of constructing the reference base also includes a step 121 for extracting patches, called primitive patches, as shown in FIG. 14.

Each of the primitive patches is centred on one of the singular zones detected in step a1), and can be oriented along the principal axis XX' so as to align said singular zones along said axis.

This step is also similar to step 100 described above.

Finally, the method of constructing the reference base also includes a principal components analysis step ("ACP" step) of the set of primitive patches, possibly oriented, so as to form the reference base and extract specific reference values associated with each primitive patch.

In particular the ACP step rewrites vectors formed by primitive patches in the form of a linear combination of vectors (step 122), usually called "eigenvectors", these vectors forming the reference base that is orthogonal. In particular, the linear combination is weighted by weighting factors, also called "eigenvalues" (step 123), and each is associated with a reference patch, also called the "eigenvector".

In this regard, the ACP step comprises the following steps:
write the set of reference patches in the form of a rectangular matrix M, each column of the matrix containing a patch in the form of a vector,
calculate the matrix product $MM^T$ in order to determine the eigenvectors and eigenvalues associated with the ACP It may be decided to keep only part of the reference patches to form the reference base. In particularly, only the k (for example k=20) eigenvectors associated with the highest eigenvalues may be kept.

This hierarchisation of the reference patches according to their associated eigenvalues may advantageously be used to evaluate the quantity of discriminating information actually contained in an enrolment image. In particular, in relation to FIGS. 8a and 8b discussed above, only projections of the oriented patches onto the reference patches, called $b_1$ and $b_2$, associated with the two highest eigenvalues, are considered to quantify the quality of discriminating information. For example, the quantity of discriminating information may correspond to the ratio R between the highest projection coordinate and the lowest projection coordinate.

In particular, FIGS. 10a to 10d represent enrolment images visually classified by decreasing quantity of discriminating information. The ratio R, mentioned above each of these figures, complies with the visual classification.

It is also significant that the dispersion of the orientation θ of each of the singular points detected in step 100 may also be considered to measure the quantity of discriminating information actually contained in an enrolment image.

Therefore the invention described above can simplify the processing of papillary prints.

It also enables a judgement not only of the quality of an enrolment image, but also a quantification of discriminating information actually contained in said image. Consequently, this method is suitable when the size of the enrolment image is small.

The invention also relates to a computer program comprising instructions that, when the program is executed on a computer, lead to use of the method of processing an image of a print according to this invention.

The invention also relates to an electronic device on which the computer program mentioned above is installed, and provided with a papillary prints sensor for which acquired print images will be processed by said computer program. For example, the device may be a portable telephone, a portable computer, a secure opening system, or a handle, particularly a vehicle handle.

REFERENCES CITED

[1] Mathilde Bourjot, Régis Perrier, Jean-Françeois Mainguet, "*Etude d'algorithmes d'authentification pour petits capteurs d'empreinte digitale*" (Study of authentication algorithms for small fingerprint sensors", CORESA conference, 2017;
[2] C. Harris et al., "A combined corner and edge detector", Fourth Alvey Vision Conference, pages 147-151, 1988;
[3] S. M. Smith et al., "A new approach to low level image processing", Technical Report TR95SMS1c;
[4] D. G. Lowe et al., "Distinctive image features from scale-invariant keypoints", International Journal of Computer Vision, 60(2), pages 91-110, 2004;

The invention claimed is:

1. A method for processing an image of a papillary print designed to be executed by a computer, comprising:
a) a step for detecting at least one singular zone on the image, each singular zone being characterised by a position (p), and an orientation (θ) representative of a value of a gradient of intensity of the image at position (p);
b) a step for extracting control patches, each control patch comprising one of the singular zones detected in step a);
c) a step for projecting control patches in a reference base of reference patches, so as to determine projection coordinates of each control patch on said reference base, projection of a control patch on the reference base forming a projected patch, the reference base comprising at least two reference patches each associated with a different type of singular zone; and d) a step for calculating a difference in projection of control patches relative to the projected patches.

2. The method according to claim 1, wherein the reference base comprises reference patches associated with at least two order 2 and/or 3 singular zones.

3. The method according to claim 1, wherein step b) for extracting control patches also includes a step to orient said patches along a principal axis so as to align the singular zones with said axis.

4. The method according to claim 1, wherein step a) for detecting singular zones on the image comprises detection of a variation in contrast of an intensity of an enrolment image.

5. The method according to claim 4, wherein detection of the contrast variation includes calculation of spatial derivatives of intensity of each position of the enrolment image.

6. The method according to claim 4, wherein step a) includes use of the Harris method.

7. The method according to claim 1, wherein each control patch extracted in step b) is written in vector form, the vector form including intensities of each pixel of the patch considered, for components.

8. The method according to claim 1, wherein step d) for calculating the projection difference includes calculation of a construction error, said construction error including the calculation of a normalised sum of differences between each control patch and its reconstructed patch.

9. The method according to claim 8, wherein an enrolment image is qualified as a quality image when the construction error is less than a predetermined value.

10. The method according to claim 1, wherein the method also includes a step e) for quantifying discriminating information contained in an enrolment image, said discriminating information relating to singular points actually detected in step a).

11. The method according to claim 10, wherein step e) includes the evaluation of dispersion of at least two projection coordinates, for a set of control patches, relative to at least two reference patches called principal reference patches.

12. The method according to claim 1, wherein the singular zones detected in step a) comprise order 2 or higher characteristics.

13. The method according to claim 1, wherein the reference base is constructed from at least one reference image, of at least one papillary print.

14. The method according to claim 13, wherein construction of the reference base comprises the following steps:

a1) a step for detecting singular zones on the at least one reference image, each singular zone called a primitive singular zone being characterised by a position p1, and an orientation ($\theta$) representative of a value of a gradient of an intensity of the reference image at position p1;

b1) a patch extraction step to extract primitive patches, each of the primitive patches being centred on one of the primitive singular zones detected in step a1); and c1) a step for analysing the set of primitive patches into principal components oriented so as to extract the reference base and associated reference eigenvalues.

15. The method according to claim 14, wherein the singular zones detected in step a1) comprise order 1 or higher characteristics.

16. The method according to claim 14, wherein step b1) for extracting primitive patches also includes a step to orient said patches along the principal axis so as to align the primitive singular zones with said axis.

17. A non-transitory computer readable medium storing instructions that, when the instructions are executed by a computer, lead to implementation of the method according to claim 1.

18. An electronic device, comprising:

processing circuitry configured to execute the instructions according to claim 17, and a papillary print sensor for which print images acquired by the print sensor will be processed by said processing circuitry.

* * * * *